United States Patent [19]
Sander et al.

[11] Patent Number: 5,249,735
[45] Date of Patent: Oct. 5, 1993

[54] CHANNEL PLATE ASSEMBLY WITH PARALLEL PLATES, PROCESS AND FIXTURE FOR MANUFACTURING THE SAME, AND PLATE APPARATUS PROVIDED WITH THE SAME

[75] Inventors: Ulrich Sander, Friedrichsdorf; Helmut Zeh, Altenstadt; Rudolf Wilhelm, Kelsterbach, all of Fed. Rep. of Germany

[73] Assignee: Metallgesellschaft Aktiengesellschaft, Frankfurt am Main, Fed. Rep. of Germany

[21] Appl. No.: 926,842

[22] Filed: Aug. 6, 1992

Related U.S. Application Data

[63] Continuation of Ser. No. 599,310, Oct. 17, 1990, Pat. No. 5,161,611.

[30] Foreign Application Priority Data

Oct. 17, 1989 [DE] Fed. Rep. of Germany ....... 3934583

[51] Int. Cl.⁵ .............................. B23K 31/02
[52] U.S. Cl. .................... 228/183; 228/189; 228/212
[58] Field of Search ............... 228/183, 189, 185, 212, 228/47, 49.1, 44.3; 269/37, 43

[56] References Cited

U.S. PATENT DOCUMENTS

| 3,703,758 | 11/1972 | Beck, Jr. .................... 228/44.3 |
| 4,191,170 | 3/1980 | Carrell .................... 126/449 |
| 5,161,611 | 11/1992 | Sander et al. ................ 165/166 |

FOREIGN PATENT DOCUMENTS

| 137672 | 6/1986 | Japan ................... 228/183 |
| 859065 | 8/1981 | U.S.S.R. ................ 228/183 |
| 1484124 | 8/1977 | United Kingdom ........ 228/183 |

*Primary Examiner*—Samuel M. Heinrich
*Attorney, Agent, or Firm*—Michael J. Striker

[57] ABSTRACT

In a process of manufacturing a channel plate assembly including a plurality of partial plates confining passages for a first medium which continuously define on all sides in direction of flow and interconnected by a plurality of spacers spaced apart in the direction of flow, the spacers are fixed in a fixture and joined to a first plate, and then the spacers are joined to another plate in a fixture on a side which faces away from the first plate.

3 Claims, 7 Drawing Sheets

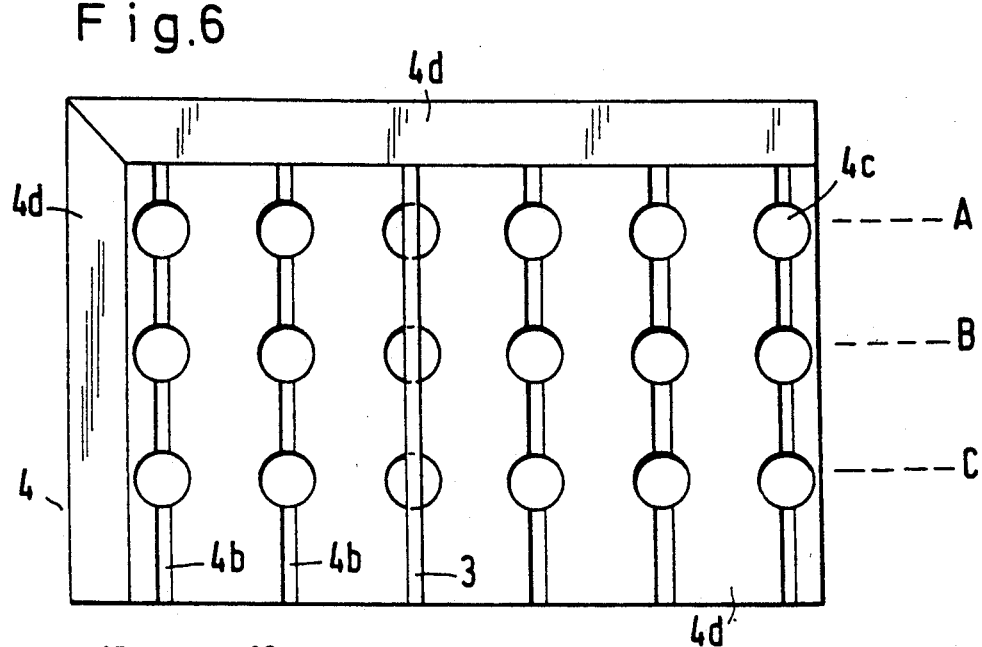
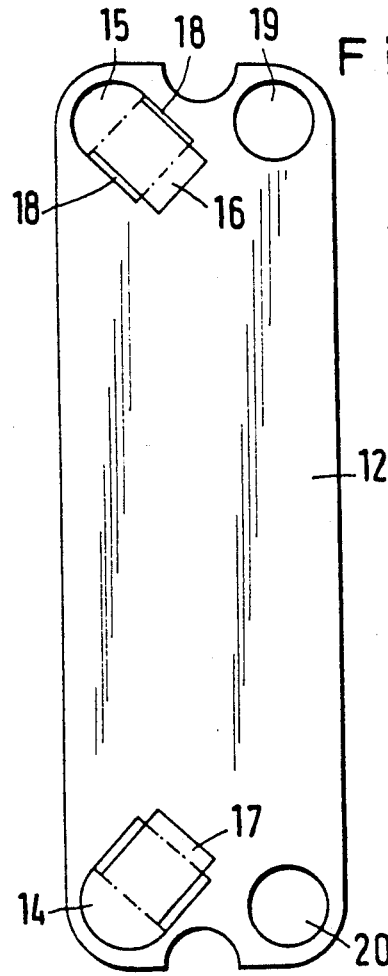
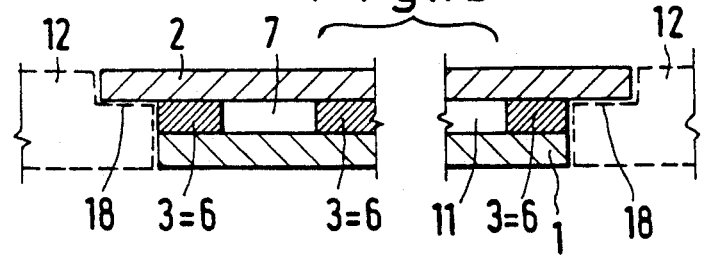
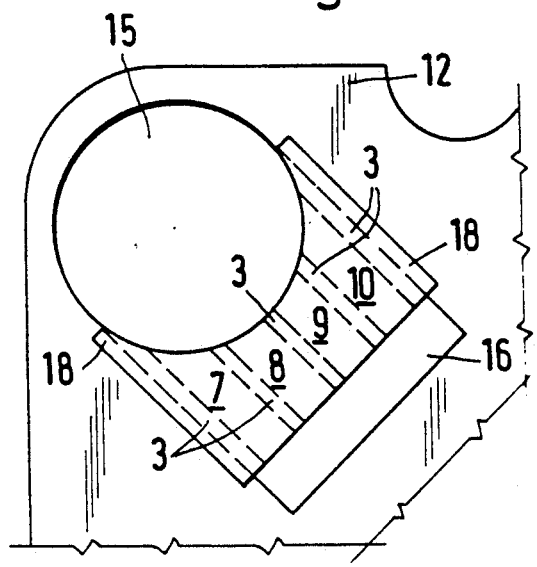

CHANNEL PLATE ASSEMBLY WITH PARALLEL PLATES, PROCESS AND FIXTURE FOR MANUFACTURING THE SAME, AND PLATE APPARATUS PROVIDED WITH THE SAME

This is a continuation of copending application Ser. No. 07/599,310, filed on Oct. 17, 1990, now U.S. Pat. No. 5,161,611.

BACKGROUND OF THE INVENTION

The present invention relates to a process to manufacture a channel plate assembly including a plurality of parallel plates.

Problems arise in the supply of flowing fluids to the flow-conducting plates of plate apparatuses, such as plate-type heat exchangers and separators for removing components from flowing mixtures by means of selectively permeable sheet material. It is necessary, on the one hand, to supply the flowing fluids in a distribution which is as uniform as possible to the flow-guiding plates of the plate apparatus. On the other hand, the pressure drop must be minimized, and this will be very difficult particularly if the flow rates of the fluid are high. Published German Application 36 01 909 describes an apparatus for separating individual components from flowing fluid mixtures by means of selectively permeable sheet material (pervaporization, permeation of gas, reverse osmosis, ultrafiltration). That separating apparatus consists of a stack of substantially rectangular platelike elements, which have identical external contours and have been assembled from commercially available flow-guiding plates of plate-type heat exchangers to form a stack and are sealed at their edges and compressed between terminal flow-guiding plates by means of tie rods so that shallow flow-utilizing spaces are provided in the interior of the stack and integrated supply and discharge passages for flowing fluids are provided at the four corners. The flowing fluids are supplied by means of channel plate assemblies, each of which consists of a base plate formed with grooves and a cover plate, which are joined to each other. Each channel plate assembly has the same thickness as the flow-guiding plate. The cover plate has edge strips, which protrude beyond the base plate and are used to fit the channel plate assembly in corresponding supports provided on the flow-guiding plate. The channel plate assembly described in Published German Application 36 01 909 has the disadvantage that fluids flowing at a high rate will suffer a relatively high pressure drop. A plate apparatus in which flowing fluids are supplied through a channel plate assembly as disclosed in Published German Application 36 01 909 cannot be used to effect an adequate removal of individual components from flowing fluids by vapor permeation.

SUMMARY OF THE INVENTION

It is an object of the invention to provide for the manufacture of the channel plate assembly a technically simple process which is reliable in operation and to provide fixtures for use in the manufacturing process.

The object underlying the invention is also accomplished by a process which is used to manufacture a channel plate assembly and in which the spacers are fixed in a fixture and joined to a first plate and on that side which faces away from the first plate are subsequently joined to another plate in a fixture. That process affords the advantage that the spacers can easily be centered and that each spacer can be joined to the first and second plates in such a manner that a distortion of the plates during the manufacture of the channel plate assembly in accordance with the invention can be precluded. The process can be carried out relatively quickly so that even large numbers of channel plate assemblies in accordance with the invention can be made within relatively short time.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 6 is a top plan view showing a further fixture in which the openings consist of bores.

FIG. 7a shows a flow-guiding plate of a plate apparatus with two integrated channel plate assemblies in accordance with the invention.

FIG. 7b shows a possible arrangement of the channel plate assembly in a flow-guiding plate of a plate apparatus.

FIG. 7c is a fragmentary view showing a part of a flow-guiding plate of a plate apparatus with an integrated channel plate assembly having parallel passages.

DESCRIPTION OF THE PREFERRED EMBODIMENTS

Figure 1:
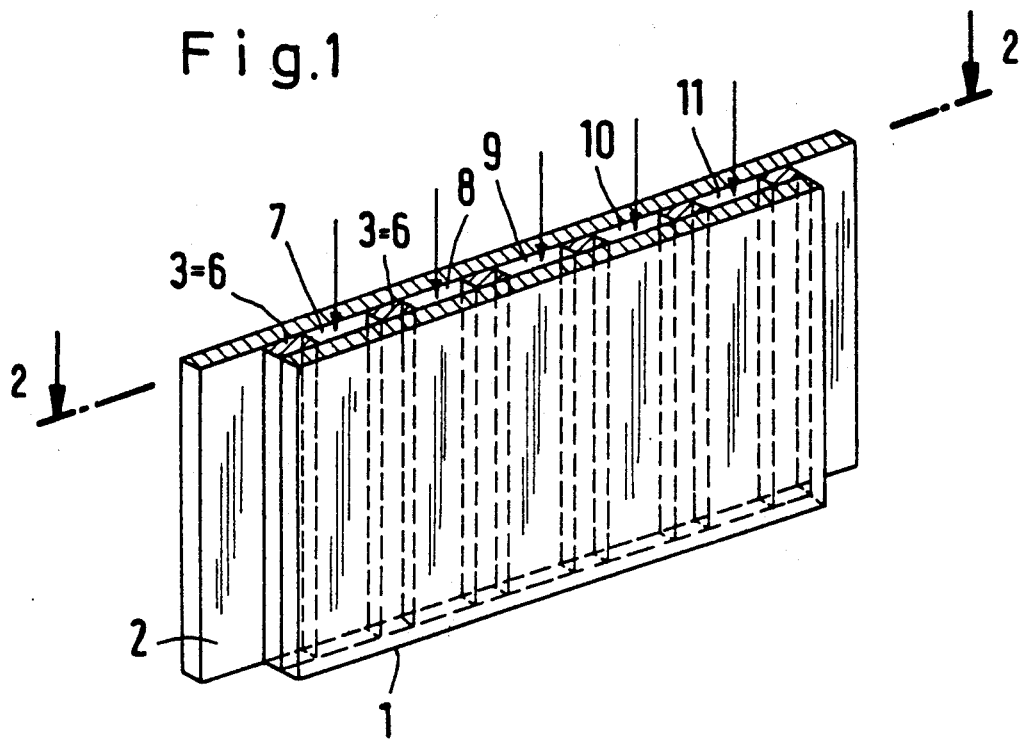
FIG. 1 is a perspective view showing a channel plate assembly.

FIG. 1 is a perspective view showing a channel plate assembly which is in accordance with the invention and comprises two parallel plates 1, 2, which are joined by spacers 3 and contain passages 7 to 11 for a first flowing fluid. In that embodiment, the spacers 3 consist of metal strips 6. The first flowing fluid enters the channel plate assembly in the direction indicated by the arrows and flows through the passages 7 to 11. In the channel plate assembly shown in FIG. 1 the second plate 2 is larger than the first plate 1 although that design feature is not essential.

Figure 2:
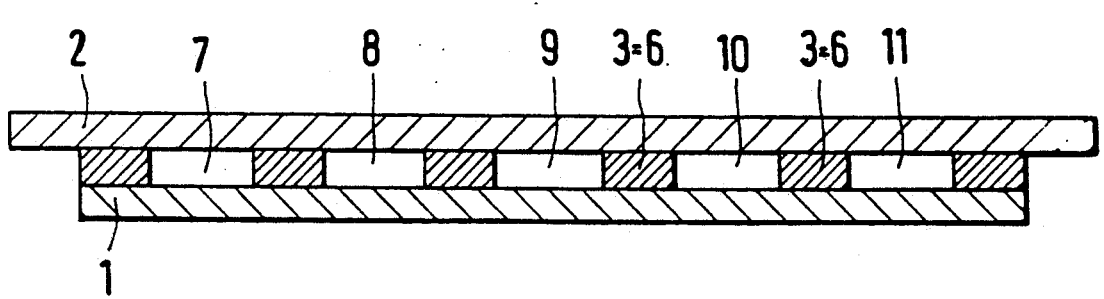
FIG. 2 is a sectional view taken on the line A—A in FIG. 1.

FIG. 2 is a sectional view taken on line A—A in FIG. 1. Spacers 3 consisting of metal strips 6 are disposed between the parallel plates 1, 2. As in FIG. 1, passages 7 to 11 for a first flowing fluid are also shown. In dependence on the flow rate of each flowing fluid, more than five passages or less than five passages for a first flowing fluid may be provided.

Figure 3:
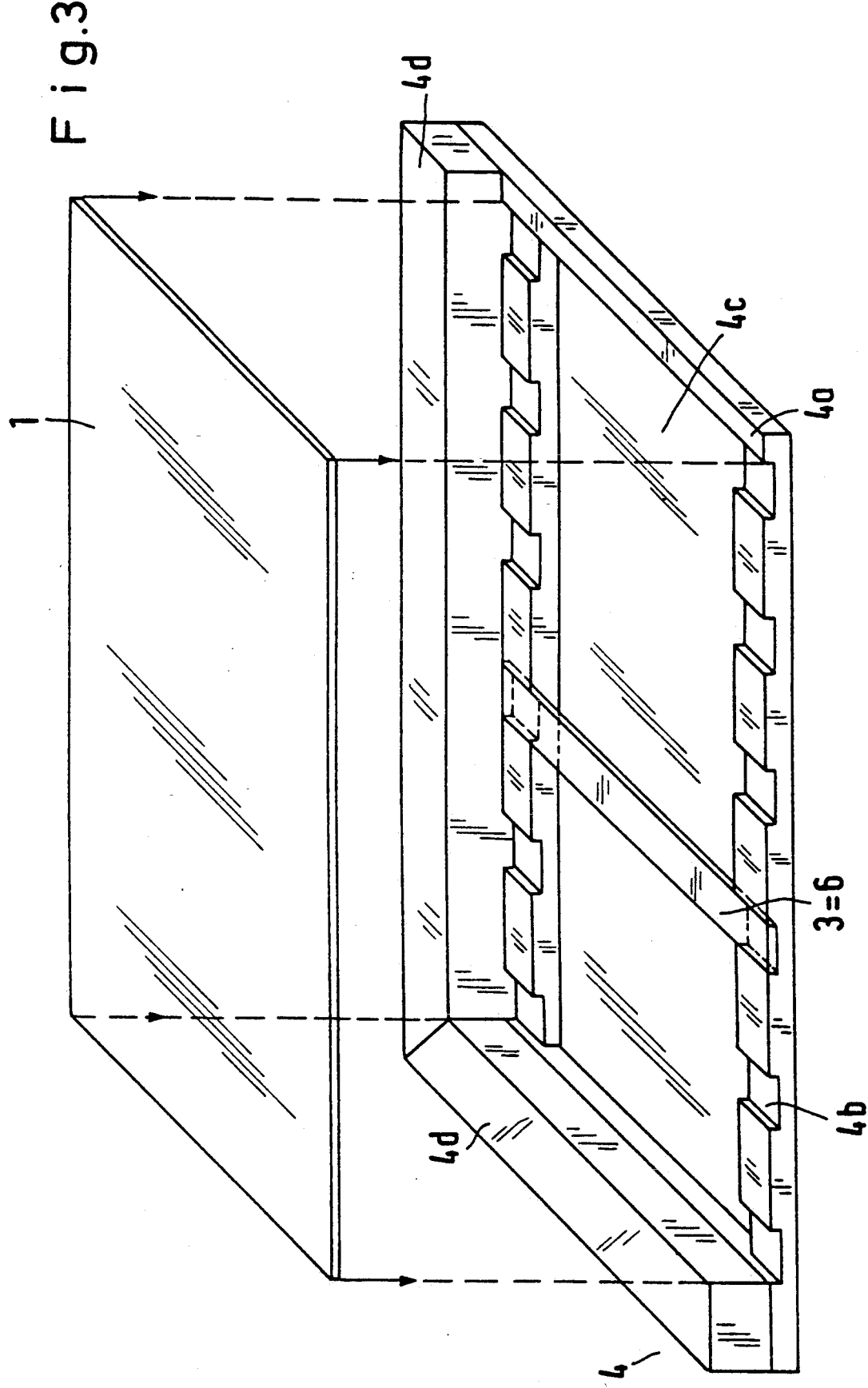
FIG. 3 shows a fixture comprising a carrier plate which has groovelike recesses, an opening, a spacer and a first plate.
Figure 4:
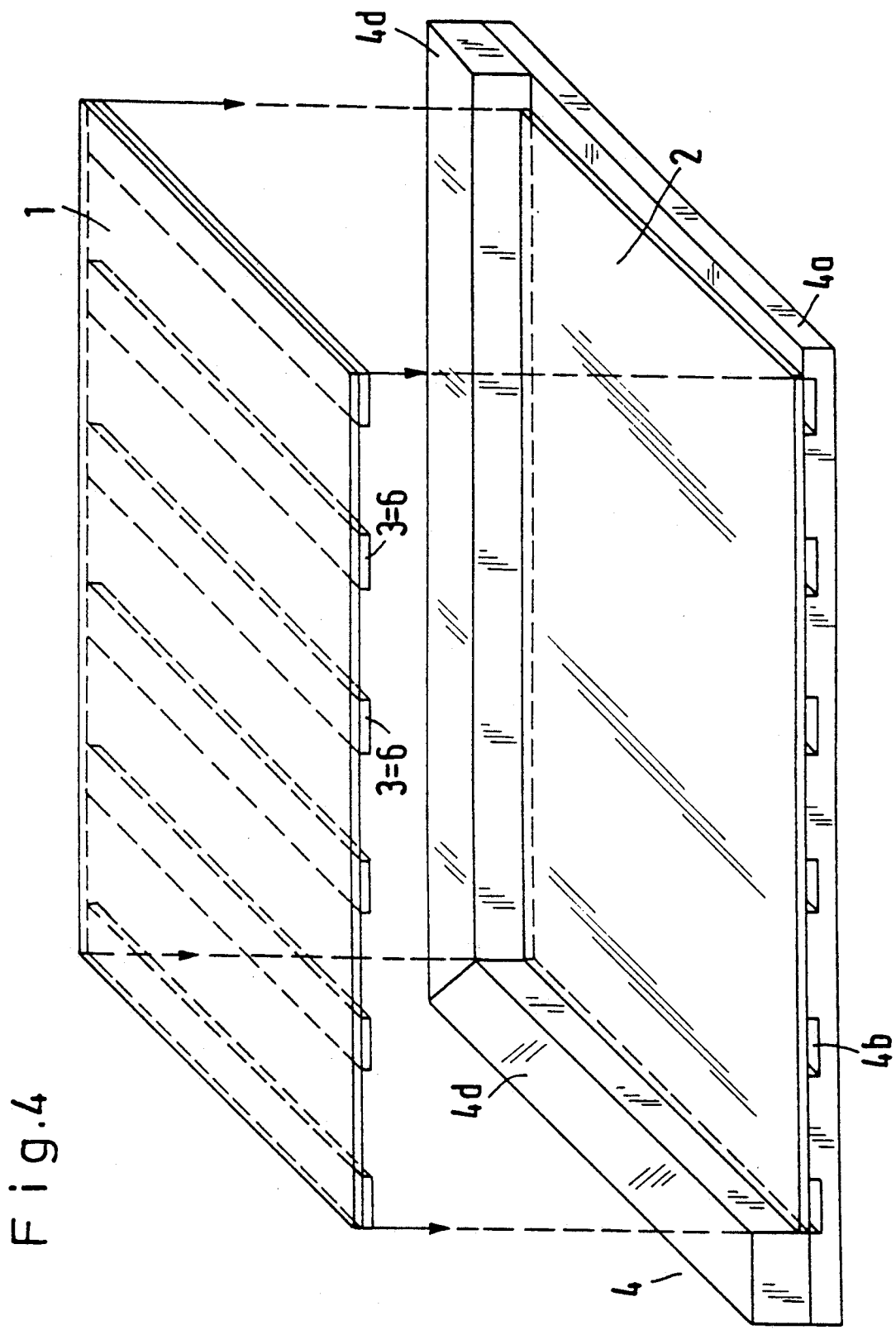
FIG. 4 shows a fixture as shown in FIG. 3 with first and second plates.
Figure 5:
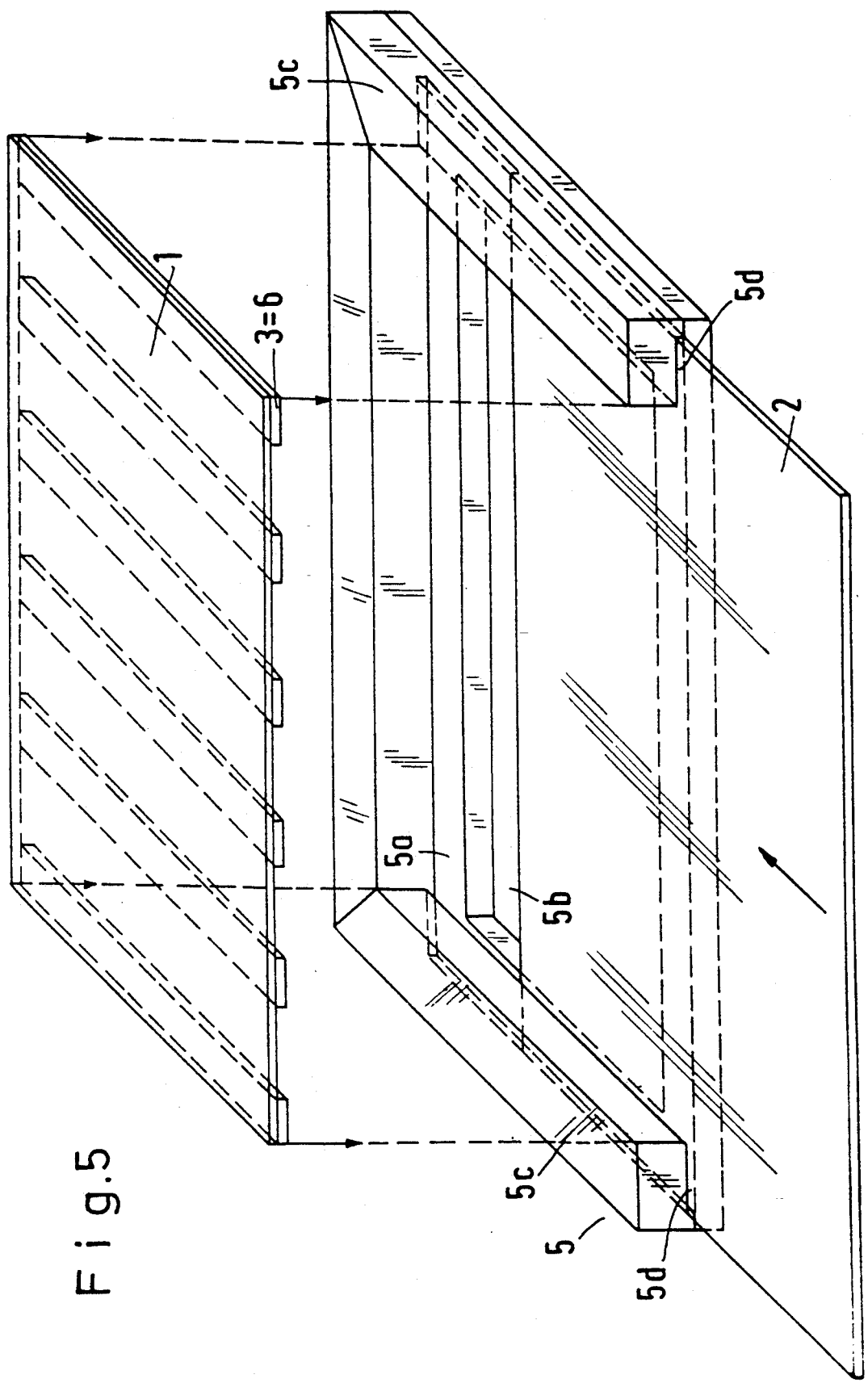
FIG. 5 shows a fixture comprising a carrier plate, an opening and a stop, which has a groove that is parallel to the plane of the carrier plate.

The process of manufacturing the channel plate assembly in accordance with the invention is illustrated in FIGS. 3 to 5. As is apparent from FIG. 3 the spacers 3 consisting in this case of metal strips 6 are initially inserted into groovelike recessed 4b of the carrier plate 4a. The carrier plate 4a is provided with a stop 4d and has an opening 4c. When the several spacers have been positioned in the groove-like recesses, the first plate 1 is placed on the carrier plate 4a and is positioned by the stop 4d of the fixture 4. The spacers 3 are then joined to the first plate 1, e.g., by welding. When the spacers 3 have been joined to the first plate 1 a second plate 2 is placed on the carrier plate 4a and is positioned by the stop 4d of the fixture 4, as is shown in FIG. 4. The spacers 3 are then placed on the second plate 2 to contact the latter on that side of the spacers 3 which faces away from the first plate 1. Because the first plate 1 has also been positioned by the stop 4d, the spacers 3 are now joined to the second plate 2, e.g., by welding. A channel plate assembly which is in accordance with the invention and comprises two parallel plates 1, 2 having the same size can be manufactured by that procedure. If the channel plate assembly is required to have laterally protruding edge strips, as is shown, e.g., in FIG. 1, i.e., if the second plate 2 is required to be larger than the first plate 1, a fixture 5 can be used in the manufacture of the channel plate assembly in accordance with the invention. FIG. 5 shows a fixture 5 comprising a carrier plate 5a that is provided with an opening 5b and with a stop 5c, which has a groove 5d that is parallel to the plane of the carrier plate 5a. The spacers 3 are initially joined in a fixture 4 to a first plate 1 in the manner described in detail hereinbefore. The larger second plate 2 is then inserted through the groove 5d of the fixture as far as to the stop 5c. The spacers joined to the first plate 1 are placed on the second plate 2 to contact the latter on that side of the spacers which faces away from the first plate 1. The plates are positioned by the stop 5c. The spacers are subsequently joined to the second plate 2, e.g., by spot welding. The opening 5b (see FIG. 5) and the opening 4c (see FIG. 3) permit an access of one electrode and may have different configurations.

FIG. 6 is a top plan view showing a further embodiment of the fixture 4, which is provided with a stop 4d, a carrier plate 4a, which has groovelike recesses 4b, and openings 4c. The openings 4c consist of bores and are arranged in three rows of holes A, B, C. A spacer 3 is shown in one groovelike recess 4b. If the openings 4b consist of bores, the spacers 3 can be more easily joined to the plates 1, 2 by spot welding because the electrode can be guided in the associated opening 4c. This will facilitate an automatic manufacture.

FIG. 7a shows a flow-guiding plate 12 of a plate apparatus with two integrated channel plate assemblies in accordance with the invention. One channel plate assembly shown in phantom is connected to an inlet 14 for a first flowing fluid. The second channel plate assembly shown in phantom is connected to an outlet 15 for a first flowing fluid. The two channel plate assemblies shown in phantom are arranged in apertures 16 and 17 of the flow-guiding plate 12. The second plate 2 is larger than the first plate 1 and has been joined to supports 18 of the flow-guiding plate 12.

FIG. 7b is a transverse sectional view showing the channel plate assembly and the flow-guiding plate 12, which is provided with supports 18. The spacers 3 and the passages 7, 11 for a first flowing fluid are arranged between the plates 1 and 2. The second plate 2 is larger than the first plate 1 and is joined to the flow-guiding plate 12 by the supports 18. The second plate 2 can be joined to the support 18, e.g., by welding or by an adhesive.

FIG. 7c is a fragmentary view showing a part of the flow-guiding plate 12 provided with an integrated channel plate assembly and with an outlet 15 for a first flowing fluid. The channel plate assembly has parallel passages 7 to 10 for a first flowing fluid and in an aperture 16 is joined to the flow-guiding plate 12 by supports 18 as shown in FIG. 7b. The channel plate assembly differs from that shown in FIG. 7a in that it has a circular recess conforming to the outlet 15 for a first flowing fluid.

Figure 7D:
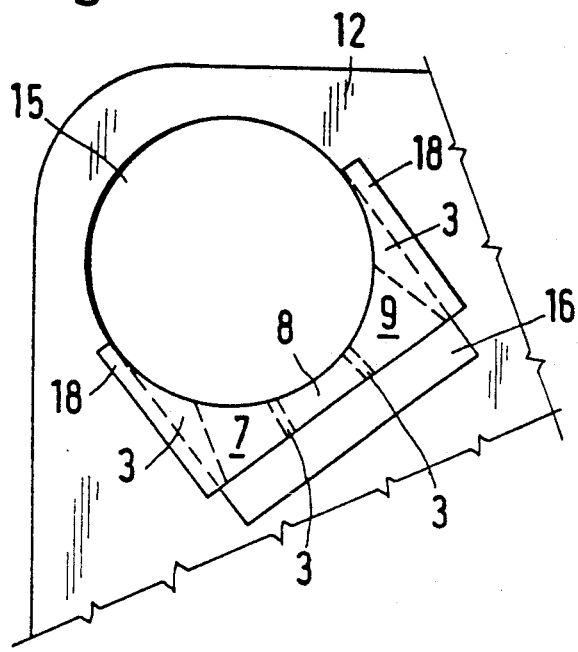
FIG. 7d is a fragmentary view showing a part of a flow-guiding plate of a plate apparatus with an integrated channel plate assembly having passages forming a starlike array.

FIG. 7d is another fragmentary view showing a part of a flow-guiding plate 12 provided with an outlet 15 for a first flowing fluid and with an integrated channel plate assembly. A difference from the channel plate assembly shown in FIG. 7c resides in that in the channel plate assembly shown in FIG. 7d the passages 7, 8 and 9 for a first flowing fluid form a starlike array.

Figure 8A:
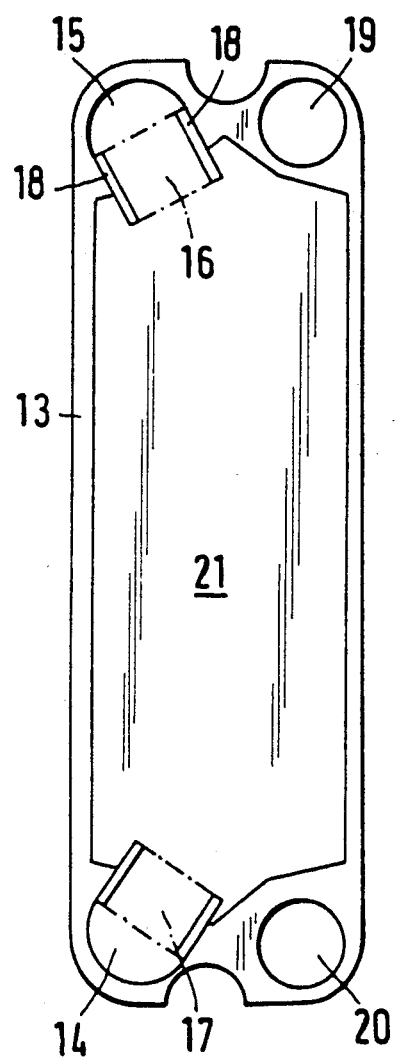
FIG. 8a shows the frame of a plate apparatus comprising two integrated channel plate assemblies in accordance with the invention.
Figure 8B:
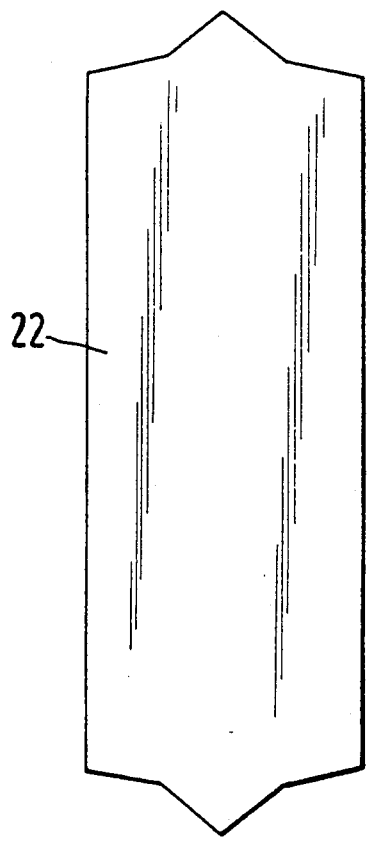
FIG. 8b shows a selectively permeably membrane for removing individual components from flowing fluids.

FIG. 8 shows a frame 13 of a plate apparatus with two integrated channel plate assemblies in accordance with the invention, which are connected to an inlet 14 and to an outlet 15, respectively, for a first flowing fluid. The frame 13 has also bores 19, 20 for a second flowing fluid. As is apparent from FIG. 7b the channel plate assemblies shown in phantom are disposed in apertures 16, 17 of the frame 13 and joined to the frame 13 at supports 18. The frame 13 consists, as a rule, of sealing material, and is disposed between two flow-guiding plates 12, and between said flow-guiding plates defines a flow-utilizing space 21. In separators for removing individual components from flowing fluids a selectively permeable membrane as shown in FIG. 8b is fixed on one side of the frame 13. Through the inlet 14 for a first flowing fluid the flowing fluid to be separated flows directly to the selectively permeable membrane 22 and flows over that membrane toward the outlet 15 for a first flowing fluid.

Figure 9:
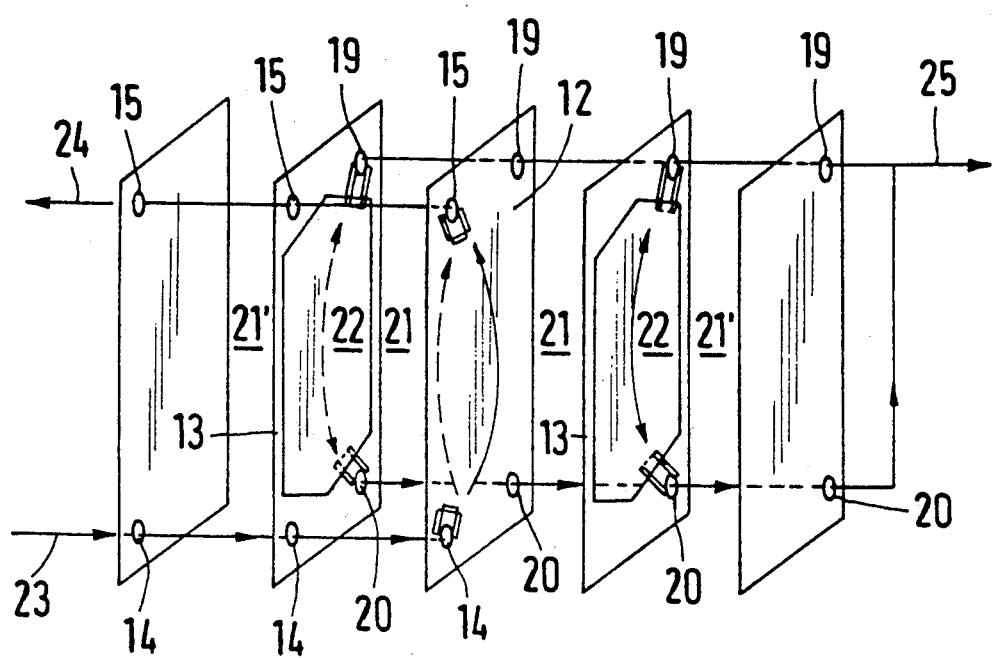
FIG. 9 shows an embodiment of a plate apparatus for removing individual components from flowing fluids by means of selectively permeable sheet material.

FIG. 9 is a simplified view illustrating the basic design of a separator which consists of a plate apparatus. The flowing fluid which is to be separated flows through the inlet 14 for a first flowing fluid to the flow-guiding plate 12 and is uniformly distributed on both sides of the flow-guiding plate 12 by a channel plate assembly which is connected to the inlet 14. The flow-guiding plate 12 extends between two frames 13, each of which is provided with a selectively permeable membrane 22 on that side which faces the flow-guiding plate 12. The membranes 22 are permeable to one component of the flowing fluid which is to be separated and that component becomes available on the rear side of the membrane. The flowing fluid to be separated flows in the flow-utilizing spaces 21 on both sides of the partition 12 to the outlet 15 for a first flowing fluid and the permeate 25 enters the flow-utilizing internal spaces 21 and further through channel plate assemblies to the bores 19, 20, which are provided in the frames 13 and serve to conduct a second flowing fluid. The retantate 24 consisting of the remainder of the flowing fluid which is to be separated is discharged from the plate apparatus through the outlet 15 for a first flowing fluid. But the channel plate assemblies in accordance with the invention may alternatively be integrated in separators which are similar to the separator described in Published German Application 36 01 909.

Figure 10:
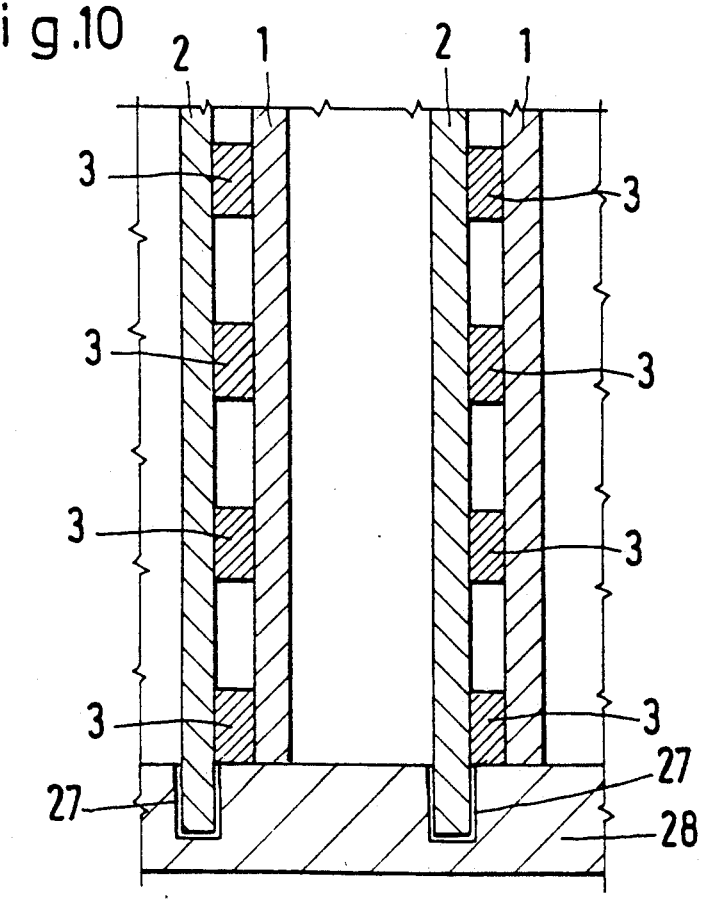
FIG. 10 is a fragmentary view showing a part of a plate-type heat exchanger with two integrated channel plate assemblies in accordance with the invention.

FIG. 10 is a fragmentary view showing a part of a plate-type heat exchanger that is provided with two channel plate assemblies which are in accordance with the invention and in each of which the second plate 2 is larger than the first plate 1. Both channel plate assemblies have passages 8 to 11 for a first flowing fluid. A further passage 26 for a second flowing fluid is provided between the two channel plate assemblies. Each channel plate assembly is joined in a groove 27 to the housing 28 of the plate-type heat exchanger.

It will be understood that each of the elements described above, or two or more together, may also find a useful application in other types of constructions and methods differing from the types described above.

While the invention has been illustrated and described as embodied in a channel plate assembly, as well as a process and a fixture for manufacturing the same, and a plate apparatus provided with the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process of manufacturing a channel plate assembly including a plurality of parallel plates confining passages for a first fluid medium each continuously defined on all sides in direction of flow and interconnected by a plurality of spacers spaced apart in the direction of flow, the process comprising the steps of fixing the spacers in a fixture and joining to a first plate; and subsequently joining the spacers to another plate in a fixture on a side which faces away from said first plate.

2. A process as defined in claim 1, wherein said joining includes joining the plates to the spacers by spot welding.

3. A process as defined in claim 2, wherein said joining includes joining the plates to the spacers by spot welding at locations spaced 2 to 100 mm apart.

* * * * *